Nov. 25, 1952  S. R. CARSON  2,619,364
FOLDING TRICYCLE
Filed Aug. 31, 1950  2 SHEETS—SHEET 1
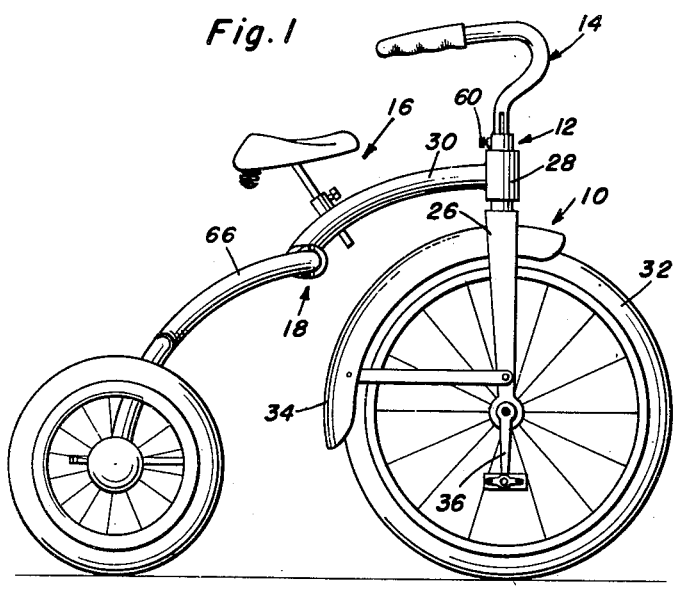
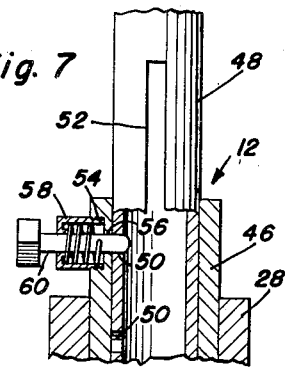
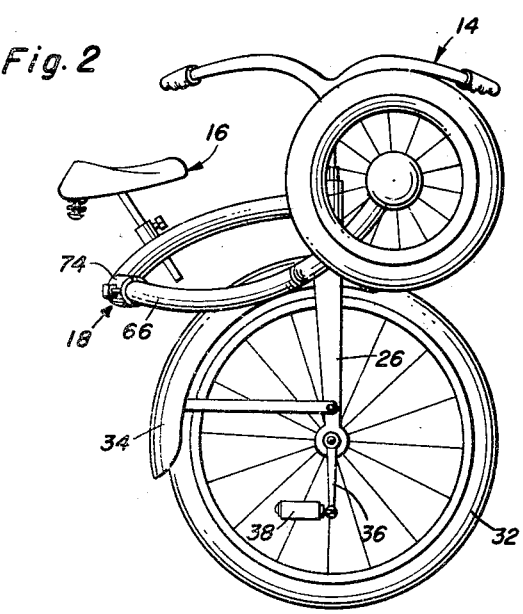
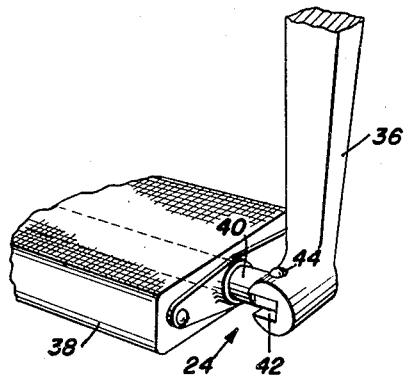
Samuel Robert Carson
INVENTOR.
BY *Clarence A. O'Brien
and Harvey B. Jacobson*
Attorneys Nov. 25, 1952     S. R. CARSON     2,619,364
FOLDING TRICYCLE
Filed Aug. 31, 1950     2 SHEETS—SHEET 2
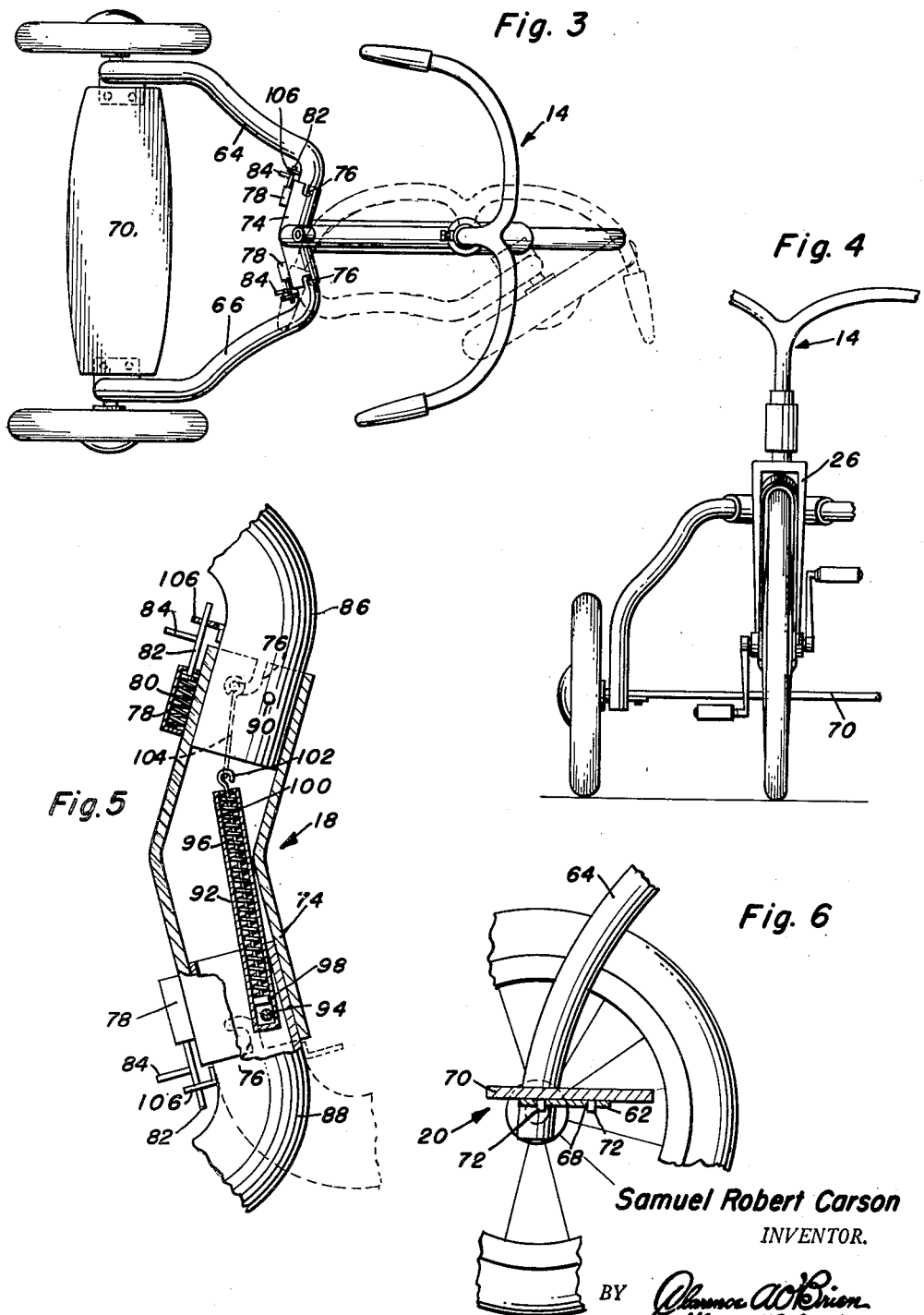
Samuel Robert Carson
INVENTOR.

Patented Nov. 25, 1952

2,619,364

UNITED STATES PATENT OFFICE 2,619,364

FOLDING TRICYCLE

Samuel Robert Carson, Columbus, Ohio

Application August 31, 1950, Serial No. 182,529

5 Claims. (Cl. 280—287)

The present invention relates to improvements in tricycles, and more particularly to the type of tricycle which is adapted to be folded during transportation of the same or for storage purposes.

An object of the present invention is to provide an improved arrangement for folding tricycles whereby the rear supporting bars of the tricycle may be maintained in the conventional relationship between the front and rear wheels or may be pivoted to a folded position above the front wheel of the tricycle.

A further object of the present invention is to provide means for securing the rear wheel supporting bars in either of the rear wheel supporting positions or in their folded position.

Still another object of the present invention is to provide a means for connecting the rear wheel supporting bars to the arcuated seat supporting bar, and wherein the rear wheel supporting bars are removably positionable within the means.

Another object of the present invention is to provide a novel rear step supporting arrangement whereby the rear step may be removably positioned between the rear wheels of the tricycle.

This invention also has for an object to provide a novel handlebar connecting arrangement, whereby the handle bar of the tricycle may be held in its conventional position for rotating the front wheel fork, or wherein the handle bar may be rotated through ninety degrees and moved downwardly within the sleeve at the front end of the arcuated seat supporting bar for its collapsed position.

The invention also comprises novel details of construction and novel combinations and arrangements of parts which will more fully appear in the course of the following description. However, the drawings merely show and the following description merely describes an embodiment of the present invention which is given by way of illustration or example only.

In the accompanying drawings:

Figure 1 is a side elevational view of the foldable tricycle of the present invention in its unfolded position;

Figure 2 is a side elevational view of the foldable tricycle in folded position;

Figure 3 is a top plan view of the present invention showing the handle bar and one of the rear wheel supporting bars in a folded position in dotted line;

Figure 4 is a front elevational view of the present invention with parts broken away;

Figure 5 is a detail view with parts in section of the means for connecting the arcuated seat supporting bar and the rear wheel supporting bars;

Figure 6 is a detail view with parts broken away showing the novel arrangement for supporting the rear step;

Figure 7 is a detail view with parts in section showing the connection between the handle bars and the handle bar supporting means; and Figure 8 is a detail perspective view showing the foldable connection between the pedal and the pedal arm.

Referring more particularly to the drawings, wherein like numerals designate like parts throughout, the numeral 10 designates generally the conventional front wheel structure of a tricycle, the numeral 12 designates generally the connection between the handle bar and the front wheel supporting means, the numeral 14 designates the conventional handle bars, the numeral 16 designates generally the arcuated seat supporting bar and conventional seat structure, the numeral 18 designates generally the connection between the arcuated bar and the rear wheel supporting bars, the numeral 20 designates generally the rear step supporting arrangement, and the numeral 24 designates generally the pedal mounting means.

The conventional front wheel assembly 10 is composed of a front wheel fork 26 which is rotatably disposed within the vertically extending sleeve 28 connected to the front end of the arcuated seat supporting bar 30. The assembly also includes the wheel 32 and mud guard 34, and a pedal arm 36 connected to the shaft of the wheel 32. The pedal 38 is pivotally and rotatably mounted with respect to the pedal arm 36, as best shown in Figure 8. The pedal 38 is rotatably mounted on the pin 40 which is pivotally mounted within the recess 42 by means of the pin 44.

The handle bar supporting arrangement is designated generally at 12 and, as seen best in Figure 7, includes an inner sleeve 46 which is rotatably disposed within the sleeve 28 and is held from vertical displacement therein. The hollow handle bar shank 48 is provided with a plurality of apertures 50 and a longitudinally extending slot 52. The sleeve 46 is provided with a recess 54 and a bore 56, and a spring retainer 58 is threadably disposed in the recess 54. A spring-pressed detent 60 is reciprocably mounted within the spring retainer 58 and bore 56 and is adapted to engage a preselected one of the apertures 50. When it is desired to place the handle bars 14 in a collapsed position, the detent 60 is removed from the aperture 50 and the handle bar shank 48 is rotated through ninety degrees until the detent 60 engages the slot 52. The handle bar may then be moved downwardly to its collapsed position.

As seen best in Figure 6, the rear step supporting arrangement 20 includes a flat bracket 62 which is fixedly secured to the rear wheel supporting bar 64, a similar bracket being secured to the other rear wheel supporting bar 66, and each of the brackets 62 is provided with a pair of apertures 68. The rear step 70 is provided with a pair of downwardly extending pins 72 at each of its end portions, and when in mounted position the pins 72 are adapted to engage the apertures 68 for maintaining the rear wheel supporting bars 64 and 66 in their desired relationship.

The arrangement designated generally at 18 and shown best in Figure 5 will now be described. The hollow angulated sleeve 74 is integrally formed with the bottom end of the arcuated seat supporting bar 30, and each of its ends is formed with a pair of L-shaped slots 76 for a purpose to be hereinafter described. The sleeve 64 is also provided with a spring housing 78 at each end with a spring 80 mounted therein and a spring-actuated detent 82 extending therefrom. Each of the spring-actuated detents 82 is provided with a finger engaging portion 84 for reciprocation thereby.

The upper angulated ends 86 and 88 of the rear wheel supporting bars 64 and 66 are removably positionable within the ends of the sleeve 74, and have pins 90 extending therethrough for engagement in the L-shaped slots 76. It should be here noted that the rear wheel supporting bars 64 and 66 are also of hollow tubular form.

Pivotally mounted within the angulated end 88 of the rear wheel supporting bar 66 is a cylinder 92 mounted on the pin 94 extending through the tubular end 88. The cylinder 92 has mounted therein a spring 96 which depresses a plunger piston 98 in a predetermined direction. The piston 98 is formed on the end of the plunger 100 which extends outwardly from the end of the cylinder 92 remote from the pivot point 94 and is formed with a hook 102 at its extremity. A connecting link 104 having hook eyes at each end is removably connected to the hook 102 and the pin 90 extending through the tubular end 86 of the wheel supporting bar 64.

Each of the angulated ends 86 and 88 is also provided with a radially extending apertured bracket 106, the spring actuated detent 86 being adapted to have its ends engaged in the apertures of the brackets 106.

When it is desired to fold the tricycle from the position shown in Figure 1, the spring-actuated detents 82 are removed from the brackets 106 by means of the finger-engaging portions 84. After removing the rear step 70 from the brackets 62, the individual rear wheel supporting bars 66 and 64 are rotated downwardly with respect to the front wheel through a small angle until the pins in the L-slots 76 may be removed therefrom. The bars 64 and 66 will now be resiliently retained against the angulated sleeve 74 by means of the cylinder 92, spring 96, piston 98 and plunger 100 arrangement, and may be rotated to the position shown in Figure 2 with the extremities of the rear supporting bars 64 and 66 resting adjacent to the sleeve 28. Since L-shaped slots 76 are placed on both sides of the angulated sleeve 74, the pins on the angulated ends 86 and 88 of the rear wheel supporting bars 64 and 66 may be reinserted in the L-shaped slots opposite to those in which they were formerly positioned. The handle bars 14 may then be moved to their collapsed position, as hereinabove set forth, and the pedals 38 may be pivoted to their collapsed position.

It will also be seen that the folding tricycle is readily dismembered for repair or replacement.

It is believed that from the foregoing description, taken in conjunction with the drawings, a structure has been provided which will accomplish all of the objects hereinabove set forth, and further description at this point is deemed unnecessary.

Having thus described the invention, what is claimed as new is:

1. In a folding tricycle having an arcuated seat supporting bar and rear wheel supporting bars, a folding connection for removably securing the rear supporting bars to the arcuated bar comprising an angulated sleeve integrally formed with the rear end of said arcuated bar, the open ends of said sleeve adapted to axially slidably receive the upper ends of said rear supporting bars, first means resiliently connecting said rear supporting bar ends within said sleeve, second means latching said bar ends from longitudinal movement, and third means securing said bar ends from rotary movement, said first means including a cylinder pivotally mounted on the upper end of one of said rear supporting bars, a spring and plunger within said cylinder for normally urging said plunger in one direction, said plunger being removably connected to the other of said rear supporting bars.

2. In a folding tricycle having an arcuated seat supporting bar and rear wheel supporting bars, a folding connection for removably securing the rear supporting bars to the arcuated bar comprising an angulated sleeve integrally formed with the rear end of said arcuated bar, the open ends of said sleeve adapted to axially slidably receive the upper ends of said rear supporting bars, first means resiliently connecting said rear supporting bar ends within said sleeve, second means means latching said bar ends from longitudinal movement, and third means securing said bar ends from rotary movement, said second means including L-slots at each of the outer ends of said sleeve, a pin extending transversely through each of the upper ends of said rear supporting bars and engageable within said slots.

3. In a folding tricycle having an arcuated seat supporting bar and rear wheel supporting bars, a folding connection for removably securing the rear supporting bars to the arcuated bar comprising an angulated sleeve integrally formed with the rear end of said arcuated bar, the open ends of said sleeve adapted to axially slidably receive the upper ends of said rear supporting bars, first means resiliently connecting said rear supporting bar ends within said sleeve, second means latching said bar ends from longitudinal movement, and third means securing said bar ends from rotary movement, said third means including an apertured bracket secured to the upper end of each of said rear supporting bars, a spring actuated detent mounted at each end of said sleeve and adapted to engage in said apertured bracket.

4. In a folding tricycle having an arcuated seat supporting bar and rear wheel supporting bars, a folding connection for removably securing the rear supporting bars to the arcuated bar comprising an angulated sleeve integrally formed with the rear end of said arcuated bar, the open ends of said sleeve adapted to slidably receive the upper ends of said rear supporting bars, first means for resiliently connecting said rear supporting bar ends within said sleeve, second means for latching said bar ends from longitudinal movement, and third means for securing said bar ends from rotary movement in which said first means includes a cylinder pivotally mounted on the upper end of one of said rear supporting bars, a spring and plunger within said cylinder for normally urging said plunger in one direction, said plunger being removably connected to the other of said rear supporting bars, said second means including L-slots at each of the outer ends of said sleeve, a pin extending transversely through each of the upper ends of said rear supporting bars and engageable within said slots.

5. In a folding tricycle having an arcuated seat supporting bar and rear wheel supporting bars, a folding connection for removably securing the rear supporting bars to the arcuated bar comprising an angulated sleeve integrally formed with the rear end of said arcuated bar, the open ends of said sleeve adapted to slidably receive the upper ends of said rear supporting bars, first means resiliently connecting said rear supporting bar ends within said sleeve, second means latching said bar ends from longitudinal movement, and third means securing said bar ends from rotary movement, in which said first means includes a cylinder pivotally mounted on the upper end of one of said rear supporting bars, a spring and plunger within said cylinder for normally urging said plunger in one direction, said plunger being removably connected to the other of said rear supporting bars, said second means including L-slots at each of the outer ends of said sleeve, a pin extending transversely through each of the upper ends of said rear supporting bars and engageable within said slots, said third means including an apertured bracket secured to the upper end of each of said rear supporting bars, a spring actuated detent mounted at each end of said sleeve and adapted to be engaged in the apertured bracket at that end.

SAMUEL ROBERT CARSON.

REFERENCES CITED

The following references are of record in the file of this patent:

UNITED STATES PATENTS

| Number | Name | Date |
|---|---|---|
| 1,218,943 | Hudry | Mar. 13, 1917 |
| 1,474,531 | Kirschbaum | Nov. 20, 1923 |